UNITED STATES PATENT OFFICE.

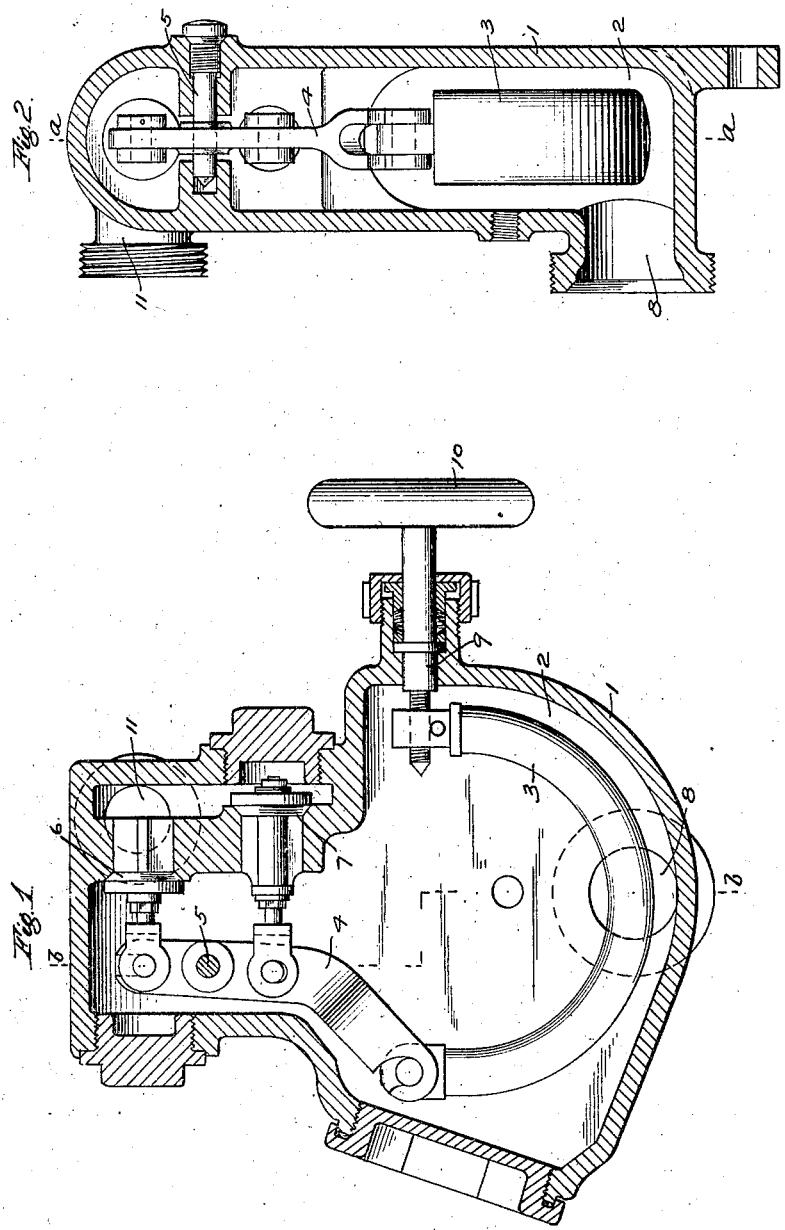

WILLIS C. SQUIRE, OF CHICAGO, ILLINOIS.

THERMOSTATIC PRESSURE-REGULATOR.

1,074,660.      Specification of Letters Patent.      Patented Oct. 7, 1913.

Application filed May 11, 1908. Serial No. 432,215.

*To all whom it may concern:*

Be it known that I, WILLIS C. SQUIRE, a citizen of the United States, residing at Chicago, in the county of Cook and State of Illinois, have invented new and useful Improvements in Thermostatic Pressure-Regulators, of which the following is a specification.

This invention relates to a pressure regulating or reducing valve adapted more particularly for controlling the admission of steam or other heating medium from a source of supply to a heating system, wherein it is desirable to reduce the pressure from a comparatively high degree to low pressure of a few pounds.

The main object of my invention is to provide an improved device of the above character whereby a low constant pressure may be readily maintained in the heating system.

With an ordinary pressure reducing valve governed by the outlet pressure for regulating the flow of liquid from the source of supply, it is difficult to maintain a constant low pressure within the narrow limits desired in a heating system. My invention contemplates the employment of a thermostat governed by the temperature of the low or reduced pressure steam which is contained in the heating system for controlling the admission of steam or other heating medium from the source of supply. This regulation of pressure by means of temperature being possible by reason of the fact that the temperature of the steam varies directly as the pressure.

In the accompanying drawing; Figure 1 is a central sectional view of my improved thermostatic pressure regulator on line *a—a* of Fig. 2, and Fig. 2 a central sectional view of the above regulator taken substantially on the line *b—b* of Fig. 1.

According to the construction shown in the drawing a casing 1 is provided, having a chamber 2 containing a thermostat 3 of any desired construction. To the thermostat 3 a lever 4 is operatively connected, the lever being pivotally mounted on a pivot pin 5 secured in the casing 1 and having valves 6 and 7 operatively connected thereto and disposed on opposite sides of the pivot pin 5. The valves 6 and 7 control the admission of the steam or other heating medium from a source of supply pipe 11 to the thermostat chamber 2, which may be connected by opening 8 with the heating system, and said valves are arranged to seat in opposite directions, so that the movement of the lever 4 in one direction opens and in the opposite direction closes both valves. This disposition of the valves is for the purpose of substantially balancing the pressure of steam acting on the valves, as will be apparent from the construction. An adjusting screw 9 operated by a hand wheel 10 is connected to the thermostat 3 for the purpose of adjusting the same to the desired degree of temperature.

It will now be evident that by adjusting the thermostat to respond to and operate the valves 6 and 7 at a certain degree of temperature the pressure of steam maintained in the chamber 2 and the heating system will correspond therewith and be kept constant by the admission of steam through the valves 6 and 7.

As a thermostat will operate and is sensible to comparatively small changes in temperature it will be seen that the pressure in the system may be very closely maintained within narrow limits.

Having now described my invention, what I claim as new and desire to secure by Letters Patent, is:—

1. A thermostatic device for regulating the flow of heating medium from a source to the heating system comprising two valves, the direction of movement to seat one valve being opposite to that of the other valve and each having different effective areas exposed to the opposing pressures of the source and the heating system for controlling the flow of heating medium from said source to the heating system, a large area of one valve and a small area of the other valve being exposed to each pressure and means governed by variations in the temperature of the heating medium in the system for operating said valves.

2. A thermostatic device for regulating the flow of heating medium from a source to the heating system comprising a casing, two oppositely seating valves therein for controlling the flow of heating medium from said source to the heating system, a thermostatic device for operating said valves, and a rocker arm operated by said thermostatic device for moving said valves in opposite directions.

In testimony whereof I have hereunto set my hand.

WILLIS C. SQUIRE.

Witnesses:
J. W. LUTTRELL,
C. W. ALLEN.